(12) United States Patent
Peirce

(10) Patent No.: US 9,657,877 B2
(45) Date of Patent: May 23, 2017

(54) TUBE COUPLING DEVICE

(71) Applicant: AGS I-Prop, LLC, Muskegon, MI (US)

(72) Inventor: John M. Peirce, Portage, MI (US)

(73) Assignee: AGS COMPANY AUTOMOTIVE SOLUTIONS LLC, Pittsburgh, PA (US)

( * ) Notice: Subject to any disclaimer, the term of this patent is extended or adjusted under 35 U.S.C. 154(b) by 271 days.

(21) Appl. No.: 14/447,658

(22) Filed: Jul. 31, 2014

(65) Prior Publication Data

US 2014/0339816 A1    Nov. 20, 2014

Related U.S. Application Data

(63) Continuation-in-part of application No. 13/851,196, filed on Mar. 27, 2013, now Pat. No. 9,194,517.

(60) Provisional application No. 61/861,142, filed on Aug. 1, 2013, provisional application No. 61/616,127, filed on Mar. 27, 2012.

(51) Int. Cl.
    *F16L 33/00*    (2006.01)
    *F16L 33/22*    (2006.01)

(52) U.S. Cl.
    CPC ....... *F16L 33/223* (2013.01); *Y10T 29/49826* (2015.01)

(58) Field of Classification Search
    USPC .......... 285/259, 398, 245, 90, 239, 404, 417
    See application file for complete search history.

(56) References Cited

U.S. PATENT DOCUMENTS

| 802,853 A | * | 10/1905 | Garner et al. ........ F16L 33/222 |
|---|---|---|---|
|  |  |  | 285/246 |
| 1,098,294 A |  | 5/1914 | Patty |
| 1,844,023 A |  | 2/1932 | Terry |
| 1,934,022 A |  | 11/1933 | Wiggins |
| 3,843,169 A |  | 10/1974 | Wise |
| 4,236,736 A |  | 12/1980 | Anderson |
| 4,340,052 A |  | 7/1982 | Dennehey et al. |
| 4,934,745 A |  | 6/1990 | Healy |

(Continued)

FOREIGN PATENT DOCUMENTS

WO    WO2013148752    10/2013

OTHER PUBLICATIONS

FlexWorks Barbed Fittings by OPW Fueling Containment Systems, Publication BFF-0001, dated Sep. 10, 2008.

*Primary Examiner* — Aaron Dunwoody
(74) *Attorney, Agent, or Firm* — Gardner, Linn, Burkhart & Flory, LLP

(57) ABSTRACT

A coupling device for coupling to a fluid line includes a connector, a sleeve and a fastener. The connector has an end portion configured for insertion into a tube end, and has an outer surface profile that has at least one protrusion at the end portion for engaging an inner surface of a tube when the end portion is inserted into the tube end. The sleeve is configured for positioning at least partially around the connector and the tube end. The fastener threadedly engages a threaded outer surface of the sleeve, and when the fastener is threaded onto the sleeve, the inner surface profile of the sleeve engages the tube at the end portion of the connector to substantially clamp around the tube at the connector. The coupling device includes at least one clamping element for enhancing clamping of the sleeve around the tube at the connector.

8 Claims, 9 Drawing Sheets

(56) References Cited

U.S. PATENT DOCUMENTS

| | | | |
|---|---|---|---|
| 5,388,871 A | | 2/1995 | Saitoh |
| 5,452,748 A | | 9/1995 | Simmons et al. |
| 5,678,867 A | * | 10/1997 | Monaghan ............ F16L 33/222 |
| | | | 285/242 |
| 6,003,906 A | | 12/1999 | Fogarty et al. |
| 6,517,122 B1 | | 2/2003 | Minemyer |
| 6,846,124 B2 | | 1/2005 | Warburton-Pitt |
| 6,916,051 B2 | | 7/2005 | Fisher |
| 7,108,292 B2 | | 9/2006 | Lipscomb et al. |
| 7,648,178 B1 | | 1/2010 | Andros |
| 7,690,699 B2 | | 4/2010 | Smahl |
| 2008/0272590 A1 | | 11/2008 | Howard et al. |
| 2013/0257041 A1 | | 10/2013 | Peirce |

* cited by examiner

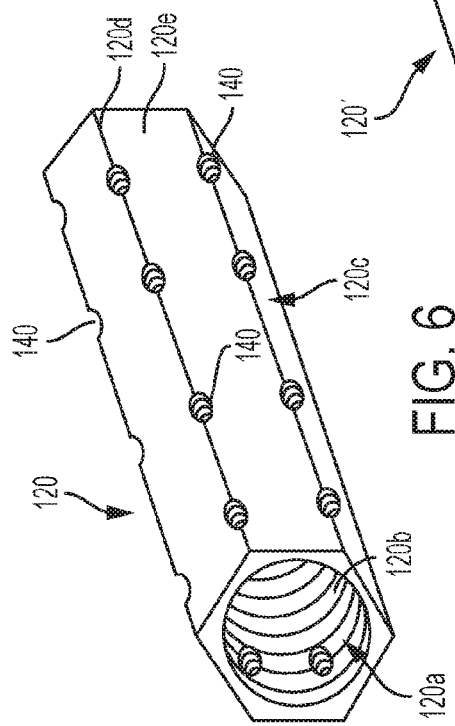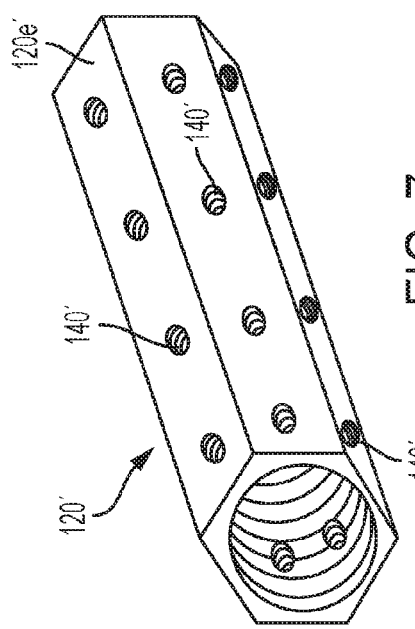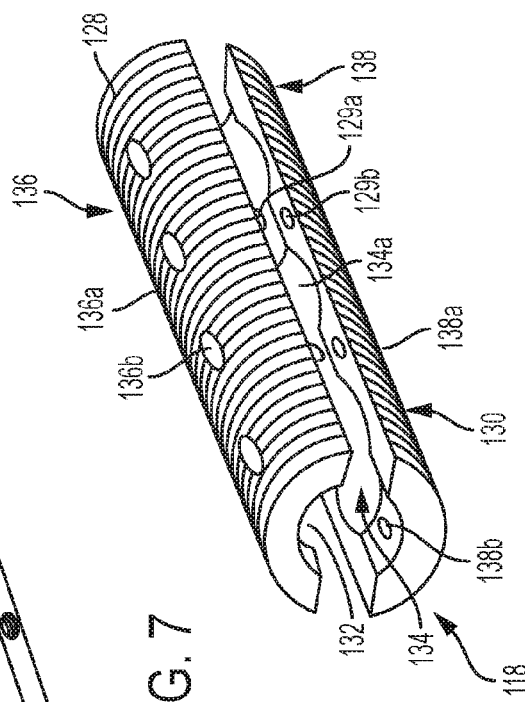

TUBE COUPLING DEVICE

CROSS REFERENCE TO RELATED APPLICATIONS

The present application claims priority of U.S. patent application Ser. No. 61/861,142, filed Aug. 1, 2013, and the present application is a continuation-in-part of U.S. patent application Ser. No. 13/851,196, filed Mar. 27, 2013, which claims the filing benefit of U.S. provisional application, Ser. No. 61/616,127, filed Mar. 27, 2012, which are hereby incorporated herein by reference in their entireties.

FIELD OF THE INVENTION

The present invention relates generally to couplers and fittings for joining or splicing fluid lines together.

BACKGROUND OF THE INVENTION

Fluid lines, conduits, hoses, and the like are commonly used for conveying fluids from one portion of a vehicle to another. Such conduits may be associated with fuel, engine and transmission oils and other lubricants, power steering fluid, coolants or refrigerants, hydraulic brake fluids, shock absorber fluid, ride-height control fluid, and/or the like. When a fluid line cracks or leaks, the line needs to be replaced or a damaged part of the line may be removed and the opposed ends of two separate lines may be spliced together.

SUMMARY OF THE INVENTION

The present invention provides a coupler or splicing assembly for use in coupling a fluid line. The coupler of the present invention includes a barbed connector that is inserted into the opposed ends of the fluid lines that are to be spliced together, and includes a sleeve or jacket that substantially envelopes or encases the tube and connector assembly so as to provide substantially uniform clamping around the tube and connector assembly when one or more fasteners are tightened onto the sleeve or jacket.

According to an aspect of the present invention, a coupling device for coupling or splicing two fluid lines together includes a connector, a sleeve and at least one fastener. The connector has first and second end portions configured for insertion into first and second tube ends, respectively. The connector has an outer surface profile that comprises at least one protrusion at each of the end portions for engaging an inner surface of a tube when the end portion is inserted into the respective tube end. The sleeve is configured for positioning at least partially around the connector and the tube ends disposed at the first and second end portions, and the sleeve comprises an inner surface profile that generally corresponds with the outer surface profile of the connector. The sleeve also includes an outer surface that has at least one threaded portion. The at least one fastener is configured for threaded engagement with the at least one threaded portion of the sleeve. When the at least one fastener is tightened onto the sleeve, the inner surface profile of the sleeve engages the tubes at the first and second end portions of the connector to substantially clamp around the tubes at the connector.

Optionally, the sleeve comprises threaded end regions at opposite ends thereof, and the fastener comprises a pair of female fasteners, each having an inner threaded portion, such that, when the fasteners are tightened onto the respective threaded end region of the sleeve, the fasteners compress or radially urge the sleeve end portions toward and into engagement with the tubes at the connector. Optionally, the sleeve comprises first and second sleeve portions that are disposed along opposite sides of the connector and are drawn towards one another via tightening of fastener or fasteners. Optionally, the outer surface profile of the connector comprises a locating element and the inner surface profile of the sleeve comprises a locating element, such that, when the sleeve is disposed at least partially around the connector and tube ends at the connector, the locating element of the connector engages the locating element of the sleeve to align the inner surface profile with the outer surface profile.

Optionally, and particularly for high pressure hose or tube applications (where the hose or tube is a conduit for a high pressure fluid, such as a fluid under pressure of more than 300 psi, such as more than 500 psi or the like), the protrusions of the insert portions of the connector may be rounded and/or the sleeve portions (having an inner profile that substantially corresponds to the profile of the protrusions of the connector) may be threaded along substantially the entire length that encompasses the connector, whereby an elongated fastener may be threaded over and along the sleeve portions to fully encase the sleeve portions. When the fastener is fully threaded over the sleeve portions, one or more set screws may be threaded into one or more threaded holes in the fastener and may be tightened against the threaded sleeve portions (such as against flats formed or established in the threads of the sleeve portions) to further compress or clamp the sleeve portions onto the hose and to limit or substantially preclude unthreading of the fastener along the sleeve portions.

Therefore, the coupler or splicer of the present invention facilitates coupling a fluid line to a connector or coupler. The fluid line coupler provides enhanced assembly and joining of one or two tube ends at the coupler and substantially retains and seals the tube ends relative to the coupler. The fluid line coupler of the present invention provides a sleeve that is positionable at and over a connector that is received in opposed ends of two tubes, and the sleeve is clampable onto the connector and tube assembly to substantially retain the tubes at the connector and to limit fluid leakage at the joint or coupling. The sleeve or sleeve portions may be readily disposed at and aligned with the connector and tubes and may be clamped thereat via tightening of at least one fastener. Further or enhanced clamping may be provided via a plurality of set screws or threaded elements to provide radial forces at and around and along the sleeve portions after the fastener is threaded thereon.

These and other objects, advantages, purposes and features of the present invention will become apparent upon review of the following specification in conjunction with the drawings.

BRIEF DESCRIPTION OF THE DRAWINGS

FIG. 6 is a perspective view of an elongated fastener of the coupler of FIG. 4;

FIG. 7 is a perspective view of another elongated fastener for a coupler of the present invention;

FIG. 8 is a perspective exploded view of a threaded sleeve of the coupler of FIG. 4;

DESCRIPTION OF THE PREFERRED EMBODIMENTS

Figure 1:
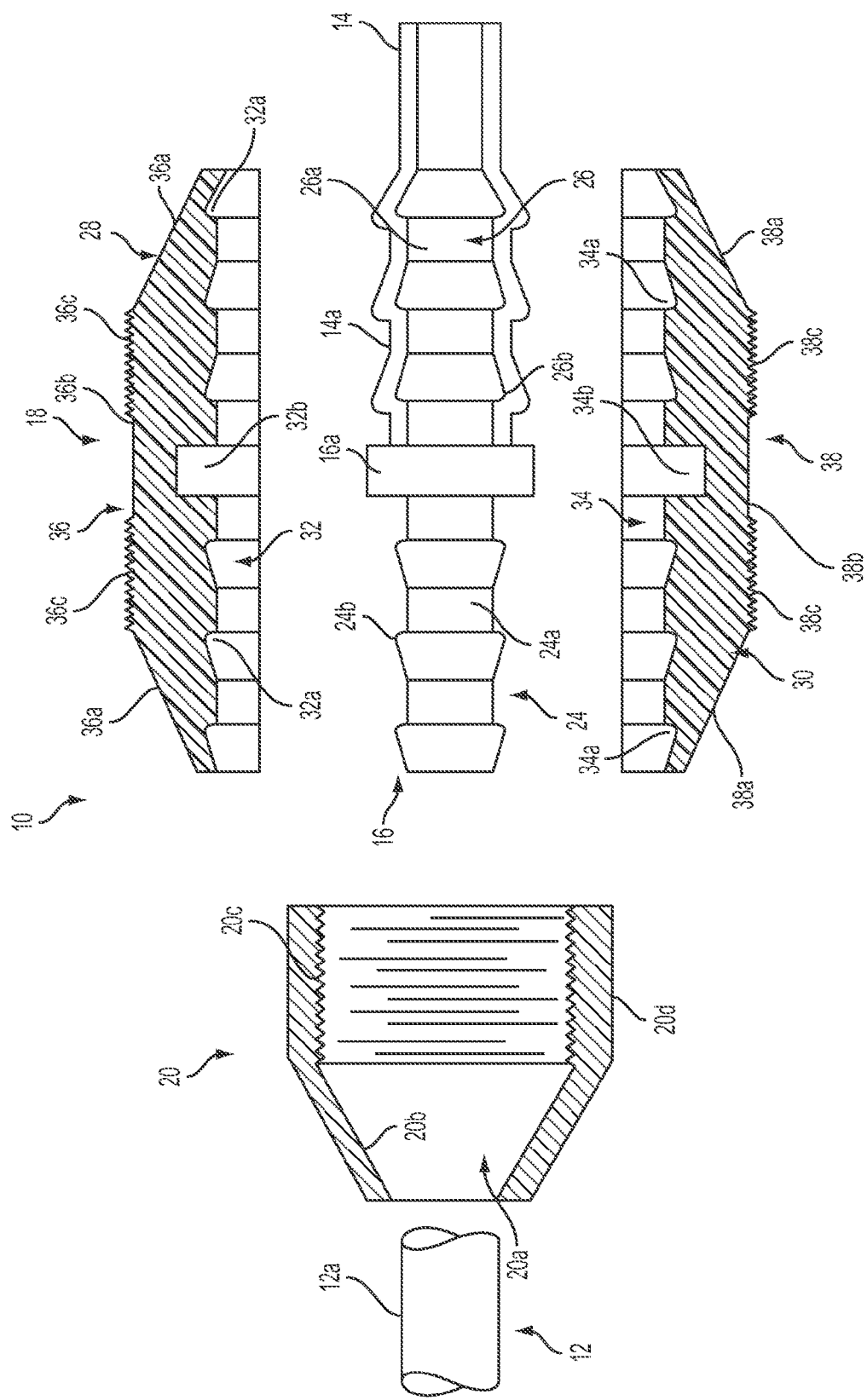
FIG. 1 is an exploded side elevation and partial sectional view of the coupler of the present invention, shown with a tube disposed at one end of the barbed connector.
Figure 2:
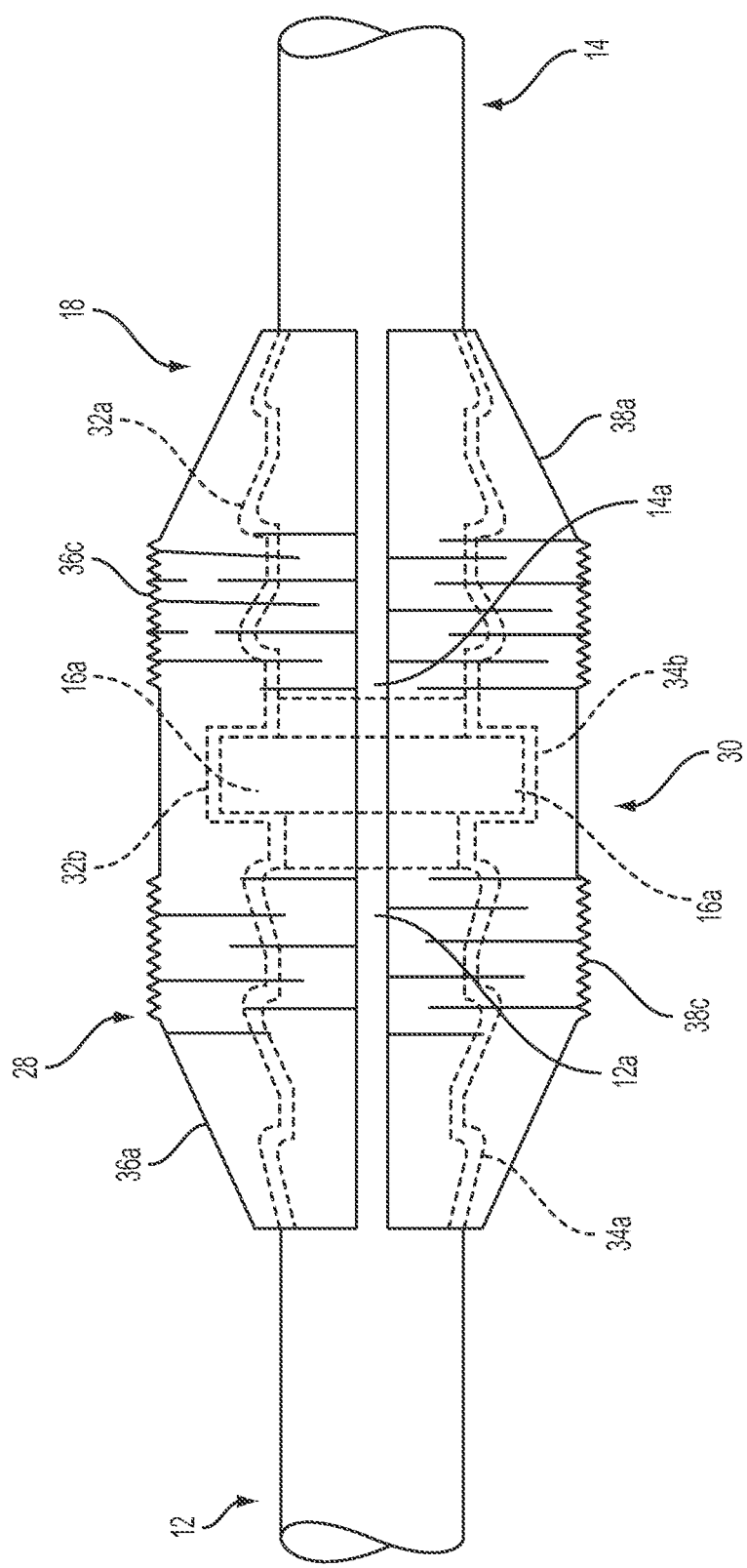
FIG. 2 is a side elevation of the sleeve of the coupler of FIG. 1, shown disposed at the barbed connector, with a tube disposed at each end of the barbed connector.
Figure 3:
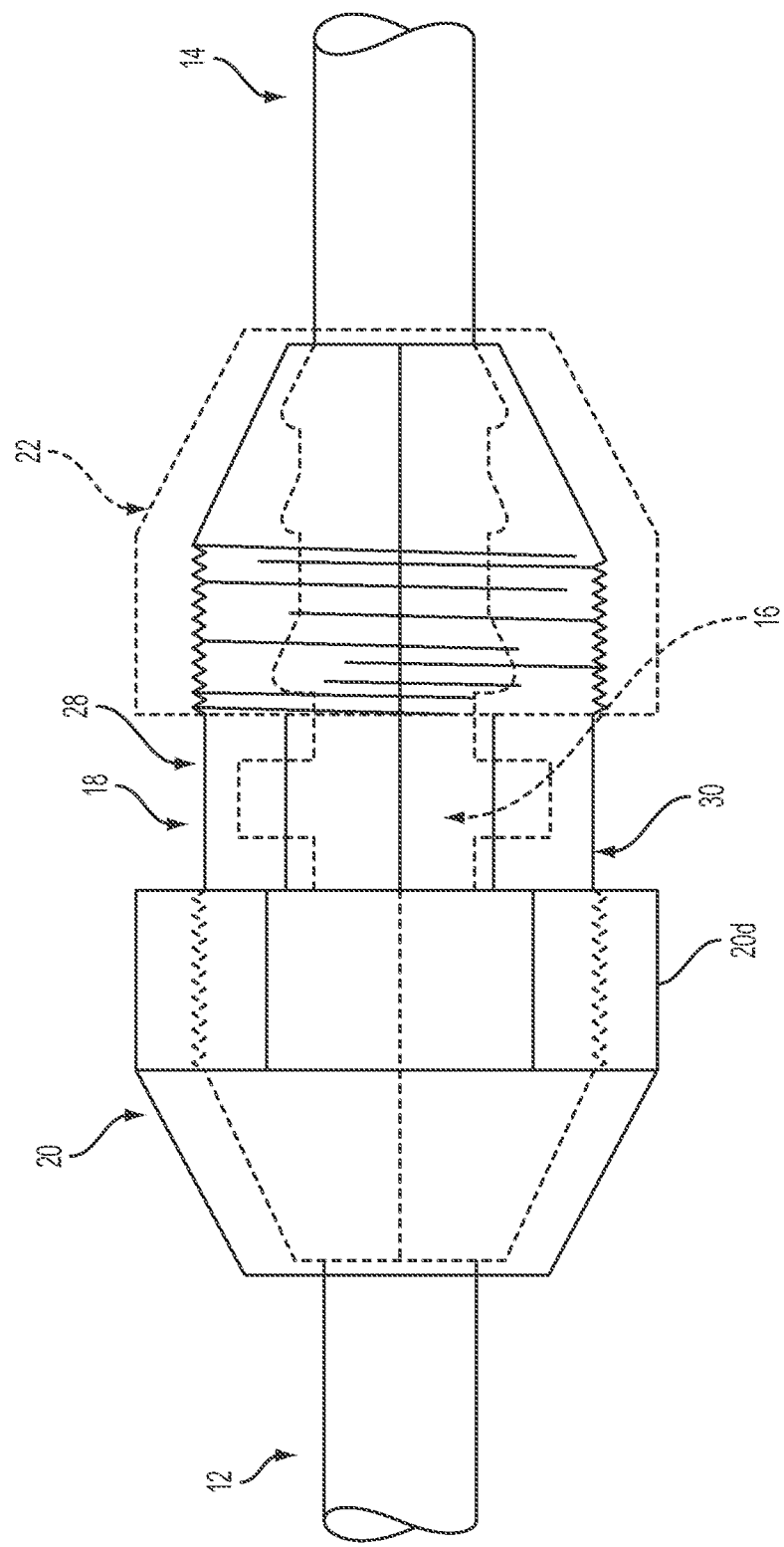
FIG. 3 is a side elevation similar to FIG. 2, shown with a threaded fastener tightened onto the sleeve to clamp the sleeve onto the tube and barbed connector disposed therein, in accordance with the present invention.
Figure 4:
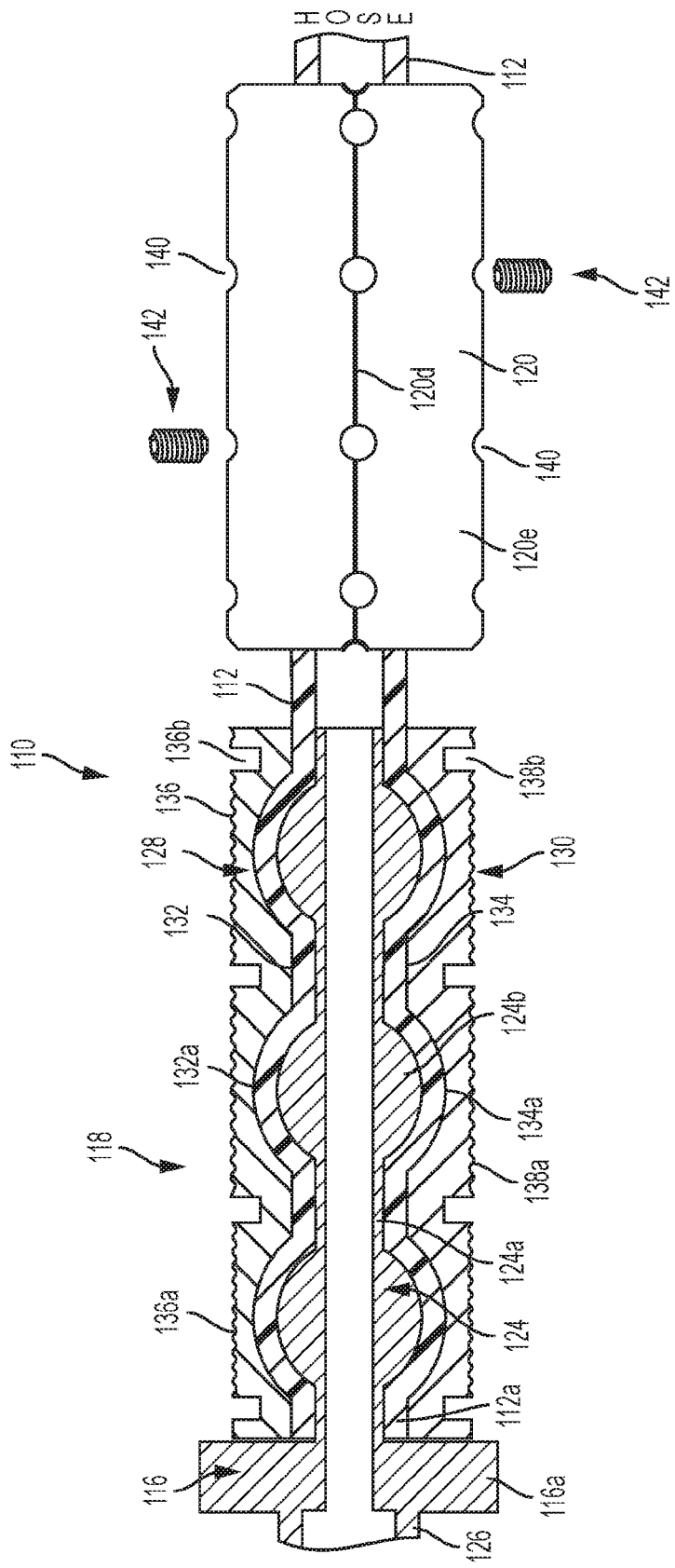
FIG. 4 is a side elevation and partial sectional view of a high pressure fluid hose or tube coupler of the present invention, shown with the elongated cover nut or fastener positioned for attachment at the threaded sleeve.
Figure 5:
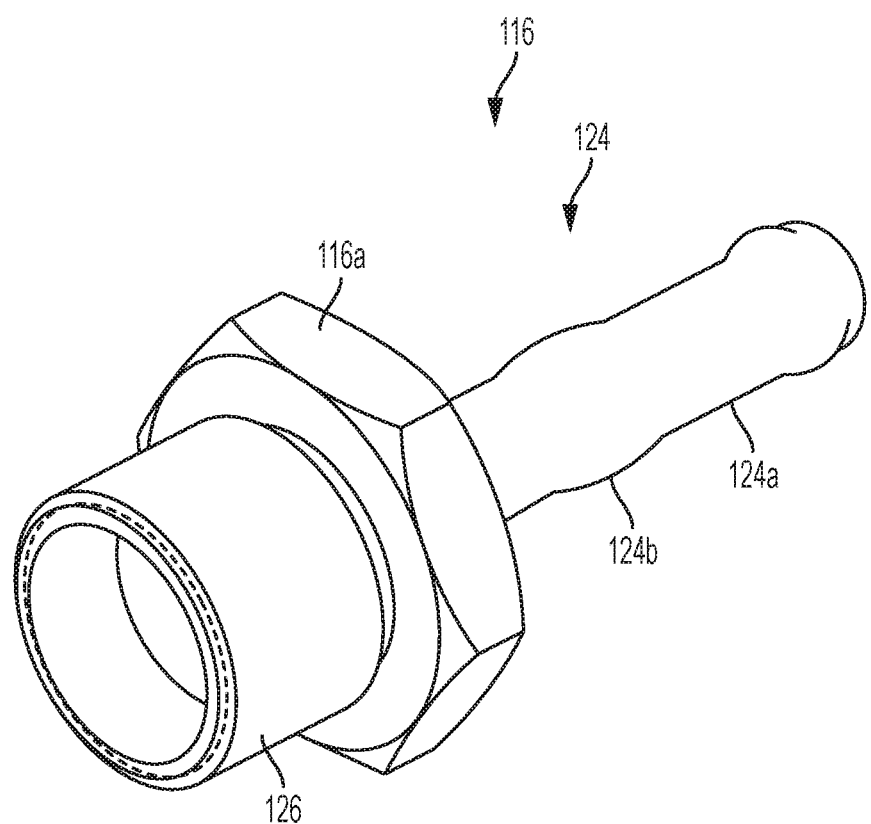
FIG. 5 is a perspective view of a connector portion of the coupler of FIG. 4.

Referring now to the drawings and the illustrative embodiments depicted therein, a coupler or splicer or coupling assembly or device 10 for coupling two ends of tubes 12, 14 together includes a barbed connector 16, a sleeve or jacket 18 and a pair of female fasteners 20, 22 (FIGS. 1-3). The barbed connector 16 has opposite end portions 24, 26 that are received into the ends 12a, 14a of the respective tubes 12, 14, and the sleeve 18 includes opposite portions 28, 30 that are disposed along the connector 16 and tubes 12, 14 and clamped thereon via tightening of fasteners 20, 22, as discussed below. The coupler of the present invention thus provides enhanced connection of the tubes 12, 14, and limits or substantially precludes retraction or disconnection of the tubes from the coupler when the fasteners 20, 22 are tightened, as also discussed below. The coupler of the present invention is suitable for coupling any types of fluid lines together, and is suitable for coupling nylon fuel lines together.

As shown in FIG. 1, each end portion 24, 26 of connector 16 comprises a generally cylindrical tube 24a, 26a that has at least one, and preferably at least two or three, barbs or protrusions 24b, 26b disposed therealong. The end portions 24, 26 extend longitudinally from a generally centrally located or disposed stop element or location boss 16a. The diameter of the tube portions 24a, 26a and the barbs 24b, 26b are selected for the inner diameter of the selected tubes that are being spliced or joined together, so that the barbed end portions 24, 26 may be inserted or received into the tube ends 12a, 14a to generally retain the tubes at the connector 16. The connector 16 may comprise any suitable material, such as a polymeric material or metallic material, and may be a substantially rigid and non-flexible construction.

Although shown and described as having generally uniform and equidistantly spaced barbs along each connector end portion 24, 26, it is envisioned that any means for retaining the tubes on the end portions 24, 26 may be utilized. The barbs or protrusions or retention means may comprise ramped outer surfaces to allow the tube to be pressed along the connector end portion and over the retention means, and may have stepped or pointed rear or inner portions or surfaces to limit retraction of the tube (and optionally to bite into the tube if the tube is pulled away from the connector) after the tube has been urged and moved over the retention means. The retention means may comprise spaced apart conical shaped ramps, such as shown, or may comprise a plurality of discontinuous protrusions or teeth spaced radially and/or longitudinally along the connector end portions.

As shown in FIG. 1, a tube end 14a may be pressed or moved over the connector end portion 26, whereby the walls of the tube 14 may flex and generally conform to the shape of the connector end portion 26. The tube end 14a may be pressed or moved along the connector end portion 26 until the end of the tube contacts the location boss 16a (or until the tube end passes the innermost of the barbs or protrusions or retention means while being spaced from the location boss). After both tube ends 12a, 14a have been pressed onto the respective connector end portions 24, 26, the sleeve 18 may be disposed at and over the connector 16 and tube ends 12a, 14a and secured thereat via the fasteners 20, 22 (only fastener 20 is shown in FIG. 1, but fastener 22 is shown in phantom in FIG. 3).

In the illustrated embodiment, sleeve or jacket 18 comprises a two-piece construction having two halves or portions 28, 30, which are disposed at respective sides of the connector and tube assembly. As can be seen with reference to FIGS. 1 and 2, the sleeve portions 28, 30 have respective inner surfaces or profiles 32, 34 that generally match the outer profile of the connector 16 (and may have some variations in the profiles to account for the addition of the tubes at the connector), and outer surfaces or profiles 36, 38 that allow for attachment or engagement with the fasteners 20, 22. In the illustrated embodiment, the inner surfaces or profiles 32, 34 include recesses 32a, 34a for receiving the tube and barbs and a generally central recess or groove or channel 32b, 34b for receiving the location boss 16a when the sleeve portions 28, 30 are positioned at the connector and tube assembly. The location boss 16a, when aligned with and received in the recesses 32b, 34b of sleeve portions 28, 30, functions to locate the sleeve 18 and sleeve portions 28, 30 at the connector 16 to generally align the recesses 32a, 34a with the barbs so that the inner surfaces or profiles 32, 34 are generally aligned with the form or shape of the connector 16, and further functions to align the threaded portions of the sleeve portions with one another so that the threaded fasteners may threadedly engage the assembled sleeve, as discussed below.

The outer surface 36, 38 of each sleeve portion 28, 30 comprises opposite ramped or tapered or partial conical-shaped ends 36a, 38a, with a center portion 36b, 38b and threaded portions 36c, 38c. Optionally, the central portions 36b, 38b may comprise a respective portion of a hexagonal-shaped fastener or cross section, such that the central region (having a generally hexagonal-shaped cross section) can be engaged by a wrench to hold the sleeve (and connector and tubes) while another wrench tightens the fastener or fasteners, as discussed below. Although shown as having a diameter that generally corresponds with the diameter of the threaded portions of the assembled sleeve, the central portion of the sleeve may have a raised or larger diameter hexagonal-shaped (or other non-circular form) portion such that a similar sized wrench can be used for holding both the fasteners and the sleeve (with a gap established between the raised center region and the location of the end of the fastener when it is fully tightened onto the sleeve, so that the fastener does not bottom out at the center region during tightening onto the sleeve onto the threaded portions of the sleeve).

The sleeve portions 28, 30 each include threaded portions 36c, 38c (at opposite sides of the central portions 36b, 38b) for threadedly engaging the female fasteners 20, 22 to clamp or secure the sleeve 18 onto the tubes and connector 16, as discussed below. Optionally, the threaded portions 36c, 38c may have threads formed along a generally cylindrical center portion, or may have threads formed on a tapered or angled or slightly conical center portion, with the diameter of the central portion increasing towards its center, such that, as the fasteners 20, 22 are tightened along the threads of the center portion, the clamping force increases as the diameter of the threaded portion of the sleeve increases. The threads of the threaded portions of the sleeve portions 28, 30 are generally aligned to establish threaded end portions of the sleeve when the sleeve is assembled at the connector and tubes, as discussed below.

As shown in FIG. 1, fastener 20 comprises a threaded female fastener having a passageway 20a established therethrough, with a conical inner surface 20b and a threaded inner surface 20c (although only fastener 20 is shown in FIG. 1, fastener 22 is substantially similar in construction and function). The diameter of the inner threaded surface 20c generally coincides with the diameter of the threaded portions 36c, 38c of the sleeve 18 when the two sleeve portions 28, 30 are fully engaged or clamped together. The ramped or conical inner surface 20b generally coincides with the angle or shape of the tapered or conical-shaped ends 36a, 38a when the two sleeve portions 28, 30 are fully engaged or clamped together. An outer surface 20d of fastener 20 may provide a hexagonal shape or other shape suitable for engaging with a wrench or tool to assist in tightening the fastener onto the threaded portion of the sleeve.

Thus, during use of the coupler 10, two fluid lines or tubes or pipes 12, 14 may be disposed at or near one another and a fastener 20 is disposed at tube 12 and a fastener 22 is disposed at tube 14 (such as via tubes 12, 14 being inserted through the passageways 20a, 22a of the fasteners). After the fasteners 20, 22 are positioned on the tubes, a tube end 12a of tube 12 may be pressed onto connector end portion 24 of connector 16 until the end is at or near the location boss 16a, and a tube end 14a of tube 14 may be pressed onto connector end portion 26 of connector 16 until the end is at or near the location boss 16a. The tubes may be pressed onto the barbed end portions of the connector via any suitable means (and after inserting the tube ends through respective ones of the female fasteners 20, 22, as discussed below), such as, for example, by warming the tubes first or by using a tool to assist in pressing the tubes along the connector, and optionally such as by utilizing aspects of the tool and fluid line stabilizer described in U.S. patent application Ser. No. 13/653,538, filed Oct. 17, 2012, which is hereby incorporated herein by reference in its entirety.

After the tubes 12, 14 are so disposed on or along or at the connector 16, the two sleeve portions 28, 30 of sleeve or jacket 18 are disposed along the connector so that the location boss 16a is generally aligned with and optionally partially received in the recesses or channels 32b, 34b of sleeve portions 28, 30, such as shown in FIG. 2. When in this configuration, the sleeve portions 28, 30 may be spaced from one another and not clamped tightly against the tubes and connector, and some spacing may exist between the inner profiles 32, 34 of the sleeve portions 28, 30 and the outer surface of the tube ends 12a, 14a, and also between the channels 32b, 34b of sleeve portions 28, 30 and the location boss 16a of connector 16, such as can also be seen with reference to FIG. 2.

When the sleeve portions 28, 30 are so positioned, the threads of the threaded portions 36c, 38c of the sleeve portions 28, 30 are generally aligned (via the aligning feature of the location boss) so that fasteners 20, 22 may be moved along the tubes 12, 14 and moved into engagement with the tapered ends 36a, 38a of sleeve portions 28, 30 and with the threaded portions 36c, 38c of sleeve portions 28, 30. As a fastener 20, 22 is moved along the tube end 12a, 14a and into engagement with the respective end of the sleeve portions, the engagement of the tapered or conical inner surface 20b, 22b of the fastener with the tapered ends of the sleeve portions, and/or the threaded engagement of the threaded inner surface 20c, 22c of the fastener with the respective threaded portions 36c, 38c of the sleeve portions 28, 30, causes the sleeve portions 28, 30 to be urged together and into engagement with and compression of the tube on the connector end portions 24, 26. Further tightening of the fasteners 20, 22 on the threaded portions 36c, 38c of the sleeve 18 causes further clamping of the sleeve portions together and onto the tube and connector assembly, such as via the movement of the conical inner surface 20b, 22b along the conical outer surface of the sleeve and/or optionally via threaded engagement of the inner threads 20c, 22c along a tapered threaded portion of the sleeve. As can be seen in FIG. 3, when the fastener 20 is fully tightened onto the sleeve 18, the two sleeve portions 28, 30 may be substantially clamped together over the tube and connector assembly to substantially clamp the tube ends at and along the barbed connector portions, so as to limit or substantially preclude retraction of the tubes from the barbed connector portions and to limit fluid leakage between the inner passageway of the tubes and the connector.

Optionally, a sealing element (such as a resilient or compressible material or the like) may be disposed between the opposed edges or surfaces of the sleeve portions so that, when the sleeve portions are urged together as the fasteners are tightened, the sealing element may be substantially clamped and compressed between the sleeve portions to further seal the joint and limit fluid leakage. Although shown and described as comprising two separate halves or sleeve portions, the sleeve portions may comprise a single hinged sleeve (such as a unitarily formed sleeve with a living hinge formed or integrally molded along one of their adjoining edges) that provides a clam shell type configuration so that the sleeve may be folded or closed onto the tube and connector with an initial gap along one side or portion of the sleeve. Optionally, the sleeve edges may provide clasping or snapping means (such as via tabs or the like) so that the sleeve portions may be snapped together at the tube and connector configuration to provide a temporary attachment to ease the tightening of the fasteners onto the sleeve to securely clamp the sleeve at the tube and connector assembly. The sleeve portions may comprise any suitable material, such as a polymeric material or metallic material, and may be a substantially rigid and non-flexible construction, or may comprise a slightly flexible or malleable or compressible material to allow the sleeve portions to partially conform to the tube and connector assembly (and optionally may comprise a generally rigid outer material and a softer inner material or the like). Optionally, the sleeve portions may include rigid tooth portions therein that bite into the tubes when the sleeve is clamped onto the tube and connector assembly to further enhance retention of the tubes on the connector.

Therefore, the present invention provides a fluid line coupler that provides enhanced assembly and joining of two tube ends and that substantially retains and seals the tube ends relative to one another. The fluid line coupler of the present invention provides a sleeve that is positionable at and over a connector that is received in opposed ends of two tubes, and the sleeve is clampable onto the connector and tube assembly to substantially retain the tubes at the connector and to limit fluid leakage at the joint or coupling. The sleeve or sleeve portions may be readily disposed at and aligned with the connector and tubes and may be clamped thereat via tightening of at least one fastener and preferably a fastener at each end of the sleeve.

The inside profile of the protective sleeve or jacket assembly substantially matches the locations of the barbs on the pressed in connector or union. The center of the connector has a location boss to ensure that the protective jacket or sleeve assembly is correctly positioned at and over the connector and tube ends. The tapered ends of the sleeve assembly correspond to the inside tapered surfaces of the fasteners or tubing nuts or fittings that are threaded over the outer surface of the protective jacket or sleeve body and that compress or clamp the jacket or sleeve (such as two portions of a sleeve or a clamshell type of sleeve construction) directly over the tubes or lines (such as a nylon fuel line) and directly onto the retaining surfaces of the barbs of the connector such that, when the fasteners are tightened, the coupler limits or substantially precludes slippage of the tubes and/or leakage of fluid at the joint or coupling. The ends of the protective jacket or sleeve may include one or more ridges or teeth inside the inner profile that may bite into the tube or tubes to further grab and hold the tube or nylon line and secure the tube ends at the sleeve and connector. The coupler of the present invention may be assembled with standard hand tools as both the tubing nuts and the outer surface of the protective jacket may have standard hexagonal shapes or configurations and sizes. Optionally, the coupler may or may not include a mounting ring or circular wrap mounting bracket for screw mounting the coupler to a frame rail or the like after the repair is completed (in order to limit or reduce vibration and movement of the coupled joint). The outside shape of the protective jacket assembly, when the sleeve portions are aligned and assembled together may provide a hexagonal (or other non-circular shape) so that the sleeve can be held in place while tightening the fastener or tubing nuts/fittings, such as by using an open end wrench or adjustable wrench or the like.

Optionally, a coupler of the present invention may be adapted or configured for use in coupling high pressure fluid lines, such as fluid lines or hoses or tubes that carry pressurized fluid at pressures of up to or more than, for example, about 300 psi, or at least about 500 psi or more. In such applications, the coupler should be secured relative to the hose or tube in a manner that maintains radial pressure around the hose at the coupler and that limits or substantially precludes loosening or detachment of the fastener of the coupler. The coupler should also provide substantial radial forces around and along the joined hose or tube and the connector portion of the coupler to maintain the coupler at the hose or tube during high pressure fluid passage in the hose or tube.

For example, and with reference to FIGS. 4-11, a high pressure fluid line coupler 110 for coupling to an end of a tube 112 includes a barbed or formed connector 116, a sleeve or jacket 118 and a female threaded fastener or cover locking nut 120. The connector 116 has an end portion 124 that is received in or inserted into the end 112a of the tube 112, and the sleeve 118 includes opposite portions 128, 130 that are disposed along the connector portion 124 and tube 112 and clamped thereon via tightening of fastener 120, as discussed below. Although shown as having one end portion 124 for connecting to a respective hose or tube 112, the coupler may be configured to connect to any type of tube or hose or pipe at its opposite end portion 126 (which may be similar to connector portion 124 or may provide a different type of coupling arrangement, depending on the particular application of the coupler). The coupler of the present invention thus provides enhanced connection of the tube, and limits or substantially precludes retraction or disconnection of the tube from the coupler when the fastener 120 is threaded onto the sleeve and secured thereat, as also discussed below. The coupler of the present invention is suitable for coupling any types of fluid lines together, and is suitable for coupling high pressure fluid lines together.

As shown in FIGS. 4, 5 and 9-11, the end portion 124 of connector 116 comprises a generally cylindrical tube 124a that has at least one, and preferably at least two or three, barbs or protrusions 124b disposed therealong. In the illustrated embodiment, the protrusions 124b comprise rounded or spherical shaped protrusions to provide a non-sharp protrusion to limit or substantially preclude cutting or damaging the tube while also substantially limiting retraction of the tube from the connector. The end portion 124 extends longitudinally from a generally centrally located or disposed stop element or location boss 116a. The diameter of the tube portion 124a and the protrusions 124b are selected for the inner diameter of the selected tubes that is being connected or joined to the connector, so that the end portion 124 may be inserted or received into the tube end 112a to generally retain the tube at the connector 116. The connector provides an inner passageway 124c through and along which fluid may flow to or from the tube joined at the connector. The connector 116 may comprise any suitable material, such as a polymeric material or metallic material, and may be a substantially rigid and non-flexible construction.

Figure 9:
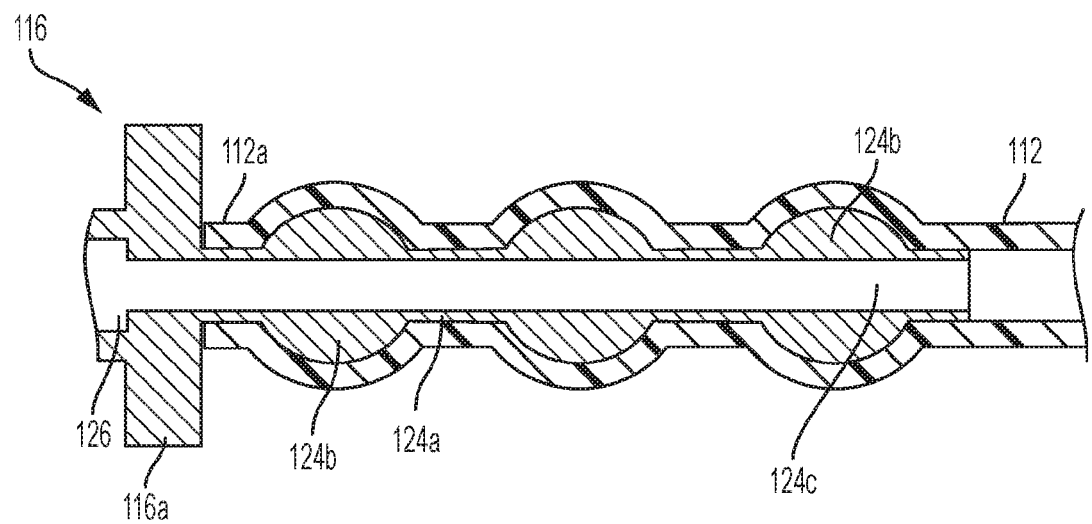
FIG. 9 is a sectional view of the connector portion with a tube disposed thereat.
Figure 10:
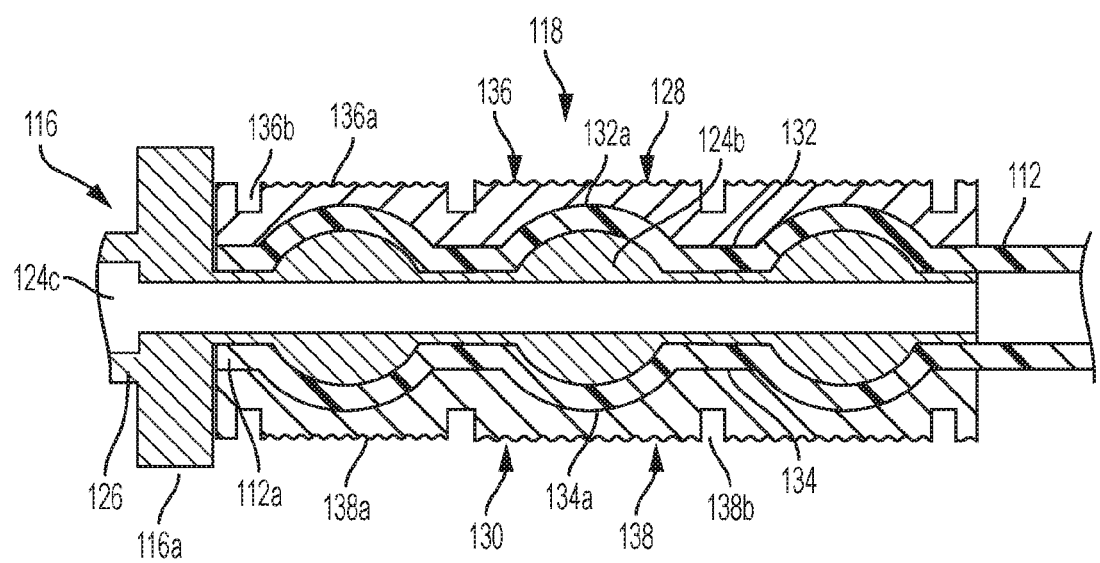
FIG. 10 is a sectional view of the connector portion of FIG. 9, with a threaded sleeve disposed thereat.
Figure 11:
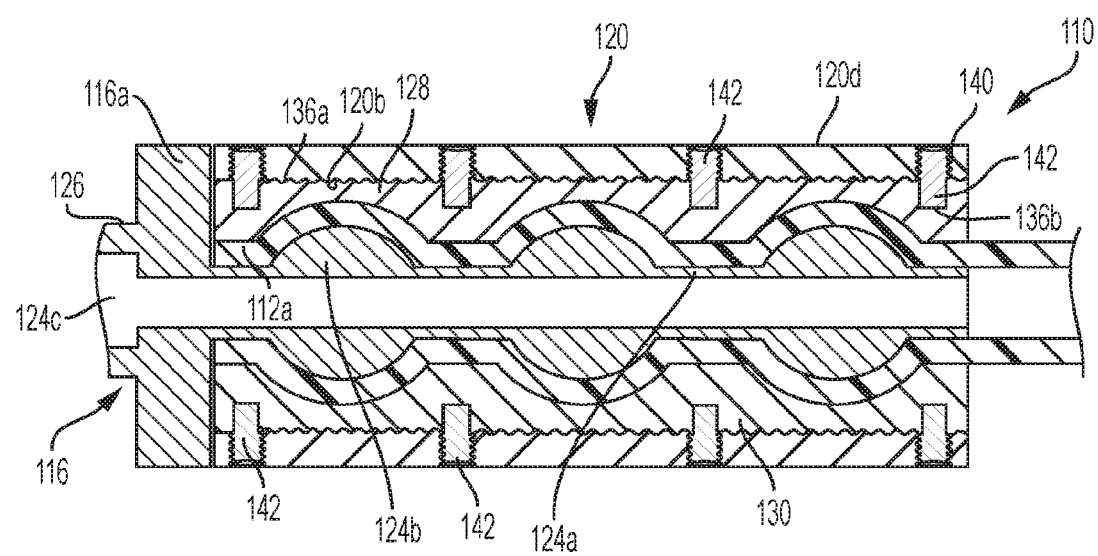
FIG. 11 is a sectional view of the coupler of the present invention, with the fastener threaded over the sleeve.

As shown in FIGS. 9-11, a tube end 112a may be pressed or moved over the connector end portion 124, whereby the walls of the tube 112 may flex and generally conform to the shape of the connector end portion 124. The tube end 112a may be pressed or moved along the connector end portion 124 until the end of the tube contacts the location boss 116a (or until the tube end passes the innermost of the barbs or protrusions or retention means while being spaced from the location boss). After the tube end 112a has been pressed onto the connector end portion 124, the sleeve portions 128, 130 of sleeve 118 may be disposed at and over the connector portion 124 and tube end 112a and secured thereat via the fastener 120, as discussed below.

In the illustrated embodiment, sleeve or jacket 118 comprises a two-piece construction having two halves or portions 128, 130, which are disposed at respective sides of the connector portion and tube assembly. As can be seen with reference to FIGS. 4, 10 and 11, the sleeve portions 128, 130 have respective inner surfaces or profiles 132, 134 that generally match the outer profile of the connector portion 124 (and may have some variations in the profiles to account for the addition of the tubes at the connector), and outer surfaces or profiles 136, 138 that allow for attachment or engagement with the fastener 120. In the illustrated embodiment, the inner surfaces or profiles 132, 134 include recesses 132a, 134a for receiving the tube and barbs when the sleeve portions 128, 130 are positioned at the connector and tube assembly. Optionally, in applications where the opposite end portion 126 of the connector is similar to end portion 124, the sleeve may be configured to extend along the entire length of the connector, with a central recess of the sleeve being configured to receive a locating boss or central portion 116a of the connector 116 when disposed thereat (such a location boss, when aligned with and received in the recesses of the sleeve portions, functions to locate the sleeve and sleeve portions at the connector to generally align the recesses with the barbs so that the inner surfaces or profiles are generally aligned with the form or shape of the connector, such as in a similar manner as described above with respect to coupler 10).

In the illustrated embodiment, the sleeve 118 is configured to encompass one end portion 124 of the connector 116 and may approach or abut the central portion 116a of the connector when disposed thereat. The outer surface 136, 138 of each sleeve portion 128, 130 comprises a threaded surface or portion having continuous threads 136a, 138a established therealong, with a plurality of flats or recesses 136b, 138b formed or established at selected locations along and around the sleeve portions.

The sleeve portions 128, 130 include threads 136a, 138a for threadedly engaging the female fastener 120 to clamp or secure the sleeve 118 onto the tube and connector 116, as discussed below. The threads of the sleeve portions 128, 130 are generally aligned to establish threaded end portions of the sleeve when the sleeve is assembled at the connector and tubes, as discussed below. Optionally, the sleeve portions 128, 130 may each include one or more tabs 129a protruding from an edge of the sleeve portion and one or more recesses 129b established at the opposite edge of the sleeve portion, such that, when assembled together, the tabs of one sleeve portion are received in the recesses of the other sleeve portion along interfacing or opposing edges of the sleeve portions, such that the sleeve portions are generally aligned and the threads are aligned for threadedly receiving the fastener 120 along the sleeve. Optionally, the sleeve may comprise a clamshell configuration with a living hinge joining one pair of edges and the opposite pair of edges having alignment features or the like.

As shown in FIGS. 6 and 11, fastener 120 comprises a threaded female fastener having a passageway 120a established therethrough, with a cylindrical threaded inner surface 120b. The diameter of the inner threaded surface 120b generally coincides with the diameter of the threaded surfaces 136a, 138a of the sleeve 118 when the two sleeve portions 128, 130 are fully engaged or clamped together. An outer surface 120c of fastener 120 may provide a hexagonal shape or other shape suitable for engaging with a wrench or tool to assist in rotating or tightening the fastener onto the threaded sleeve. A plurality of threaded holes or passageways 140 are established at selected locations along the fastener 120 for threadedly receiving respective set screws or threaded fasteners 142 to clamping against the recesses 136b, 138b of the sleeve, as discussed below.

Thus, during use of the coupler 110, two fluid lines or tubes or pipes may be disposed at or near one another and a fastener 120 is disposed at tube 112 (and optionally a similar fastener may be disposed at the other tube depending on the particular construction of the coupler), such as via the tube 112 being inserted through the passageway 120a of the fastener. After the fastener 120 is positioned on the tube, a tube end 112a of tube 112 may be pressed onto connector end portion 124 of connector 116 until the end is at or near the location boss 116a (such as shown in FIG. 9). The tube may be pressed onto the barbed end portion of the connector via any suitable means (and after inserting the tube ends through the female fastener 120), such as, for example, by warming the tubes first or by using a tool to assist in pressing the tubes along the connector, and optionally such as by utilizing aspects of the tool and fluid line stabilizer described in U.S. patent application Ser. No. 13/653,538, filed Oct. 17, 2012, which is hereby incorporated herein by reference in its entirety.

After the tube 112 is so disposed on or along or at the end portion 124 of the connector 116, the two sleeve portions 128, 130 of sleeve or jacket 118 are disposed along the connector end portion, such as shown in FIG. 10. When in this configuration, the sleeve portions 128, 130 may be spaced from one another and not clamped tightly against the tubes and connector, and some spacing may exist between the inner profiles 132, 134 of the sleeve portions 128, 130 and the outer surface of the tube end 112a.

When the sleeve portions 128, 130 are so positioned, the threads 136a, 138a of the sleeve portions 128, 130 are generally aligned (such as via the aligning feature of the location tabs or protrusions 129a established along one edge of a sleeve portion engaging the corresponding recesses 129b established along an opposing edge of the other sleeve portion) so that fastener 120 may be moved along the tube 112 and moved into engagement with the threads 136a, 138a of sleeve portions 128, 130 and threaded along the threads 136a, 138a of the sleeve portions. As the fastener 120 is moved along the tube end 112a and into engagement with the end of the sleeve portions, the threaded engagement of the threaded inner surface 120b, 122b of the fastener with the respective threaded surfaces 136a, 138a of the sleeve portions 128, 130, causes the sleeve portions 128, 130 to be urged together and into engagement with and compression of the tube on the connector end portions 124, 126. Further tightening of the fastener 120 on the threaded portions 136a, 138a of the sleeve 118 causes clamping of the sleeve portions together along the entire length of the sleeve and onto the tube and connector assembly. As can be seen in FIG. 11, when the fastener 120 is fully tightened onto the sleeve 118, the two sleeve portions 128, 130 may be substantially clamped together over the tube and connector assembly to substantially clamp the tube ends at and along the barbed connector portions, so as to limit or substantially preclude retraction of the tubes from the barbed connector portions and to limit fluid leakage between the inner passageway of the tubes and the connector.

In order to provide enhanced clamping of the sleeve onto and around and along the tube end and connector portion, the coupler 110 includes clamping or retaining elements 142 (such as set screws or allen screws or the like) that are threaded into the threaded passageways 140 of the fastener and tightened to engage and clamp against respective recesses or flats 136b, 138b of the sleeve 118 to increase the radial clamping force of the sleeve onto and around the tube and connector. In the illustrated embodiment of FIG. 6, the fastener 120 has a hexagonal-shaped outer surface or profile and the threaded passageways 140 are established along the corners or edges 120d of the hexagonal-shaped fastener 120 (between the flats 120e of the non-circular or hexagonal-shaped fastener) so that they are established at a location where the fastener has a greater wall thickness and thus may flex less when the set screws 142 are tightened to increase the radial clamping force. In applications where the fastener has other rectangular or squared or non-circular shapes, the threaded passageways may be established at the edges of the fastener between adjacent flats of the fastener. However, optionally, and as shown in FIG. 7, a fastener 120' may have threaded passageways 140' established along its flat portions 120e', while remaining within the spirit and scope of the present invention.

Thus, when the fastener 120 is substantially threaded onto the threaded sleeve 118, the fastener may be adjusted (either by further threading onto the sleeve or by backing the fastener along the sleeve) until the apertures 140 are generally aligned with the flats or recesses 136b, 138b of the sleeve. When so aligned, the set screws 142 may be threaded into a selected set of apertures (or all of the apertures if desired) and tightened against the flats or recesses 136b, 138b to clamp the sleeve tightly against and around the tube and connector end. For example, after the cover locking nut is threaded over the clamshell sleeve pieces, which are disposed over the hose and barbed connector, the cover locking nut may be tightened until it completely covers substantially the entire length of the clamshell pieces and the allen screw holes in the cover locking nut are aligned with the allen screw wells (or flats) on the clamshell sleeve pieces.

The set screws or allen screws are inserted and threaded into the threaded holes in the cover locking nut and tightened evenly along each edge (such as by having, for example, four screws and passageways along each edge of the fastener), alternating sides and direction of the tightening of the screws, until all of the screws are substantially tightened and the clamshell sleeve is forced completely onto the hose and profile of the barbs and hose at the connector. The set screws thus provide enhanced radial clamping force at locations around the sleeve and hose and connector and at locations along the sleeve and hose and connector. In the illustrated embodiment, the locations of the recesses or flats are at the locations between the protrusions of the connector so as to be at locations where the sleeve portions have a greater wall thickness to enhance clamping of the hose between the protrusions and to thus limit or substantially preclude movement of the hose along the connector, even when the hose is used as a conduit for high pressure fluid.

Changes and modifications to the specifically described embodiments may be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A coupling device for coupling to a fluid line, said coupling device comprising:
   a connector having an end portion configured for insertion into a tube end, said connector having an outer surface profile that comprises at least one protrusion at said end portion for engaging an inner surface of a tube when said end portion is inserted into the tube end;
   a sleeve configured for positioning at least partially around said connector and the tube end disposed at said end portion, wherein said sleeve comprises an inner surface profile that generally corresponds with said outer surface profile of said connector, wherein said sleeve comprises a threaded outer surface;
   a fastener for threadedly engaging said threaded outer surface of said sleeve, wherein, when said end portion of said connector is inserted into the tube end and said sleeve is positioned at least partially around said connector and tube end at said connector, and when said fastener is threaded onto said sleeve, said inner surface profile of said sleeve engages the tube at said end portion of said connector to substantially clamp around the tube at said connector; and
   at least one clamping element for enhancing clamping of said sleeve around the tube at said connector.

2. The coupling device of claim 1, wherein said sleeve comprises first and second sleeve portions that are disposed along opposite sides of said connector and are drawn towards one another via tightening of said fastener.

3. The coupling device of claim 2, comprising at least one locating element for aligning a threaded portion of said first sleeve portion with a threaded portion of said second sleeve portion when said sleeve portions are disposed at said connector.

4. The coupling device of claim 1, wherein said at least one clamping element comprises a plurality of threaded elements that are threaded through threaded passageways in said fastener and that, when so threaded, engage said sleeve to provide a radial clamping force at a plurality of locations around and along said sleeve.

5. The coupling device of claim 4, wherein said threaded outer surface of said sleeve comprises a generally cylindrical outer surface along substantially the entire length of said sleeve, and wherein said fastener comprises an elongated female threaded fastener that threads along and over said generally cylindrical threaded outer surface of said sleeve.

6. The coupling device of claim 5, wherein a plurality of recesses are established at said threaded outer surface of said sleeve, and wherein, when said fastener is substantially threaded onto said sleeve, at least some of said threaded passageways in said fastener are aligned with at least some of said recesses of said sleeve, and wherein, when said threaded elements are threaded through said threaded passageways of said fastener, said threaded elements engage said recesses of said sleeve.

7. The coupling device of claim 6, wherein said threaded passageways are established at a plurality of locations along said fastener.

8. The coupling device of claim 7, wherein said fastener comprises a multi-sided outer surface having edges between adjacent sides, and wherein said threaded passageways are established at a plurality of locations along said edges of said fastener.

* * * * *